United States Patent [19]

Denton et al.

[11] 4,131,285
[45] Dec. 26, 1978

[54] BONDED TFE LIP SEAL

[75] Inventors: Dennis N. Denton, Bessemer City; David G. Boyd, Gastonia, both of N.C.

[73] Assignee: Garlock Inc., Rochester, N.Y.

[21] Appl. No.: 739,431

[22] Filed: Nov. 8, 1976

Related U.S. Application Data

[62] Division of Ser. No. 538,542, Jan. 6, 1975, abandoned.

[51] Int. Cl.² .............................................. F16J 15/32
[52] U.S. Cl. ......................................... 277/1; 277/152
[58] Field of Search ............... 277/134, 152, 153, 182, 277/183, 47, 184, 1

[56] References Cited

U.S. PATENT DOCUMENTS

| 3,929,341 | 12/1975 | Clark | 277/134 |
|---|---|---|---|
| 3,938,813 | 2/1976 | Forch | 277/134 |

Primary Examiner—Robert I. Smith
Attorney, Agent, or Firm—Schovee & Boston

[57] ABSTRACT

A shaft seal of the type including an annular metal case and a flexible non-elastomeric sealing element such as polytetrafluoroethylene is made by molding a synthetic rubber filler ring between the metal case and the sealing element such that it bonds to both the metal case and to the sealing element, providing a faster and less expensive method of manufacturing the seal, while eliminating any leakage route between the metal case and the sealing element and also eliminating the I.D. to O.D. concentricity problem. In the embodiment where the sealing element is polytetrafluoroethylene, the filler ring chemically bonds to the metal case and mechanically bonds to the sealing element. Hydrodynamic pumping members can be molded onto the shaft engaging surface of the sealing element during the process of molding the synthetic rubber filler ring.

13 Claims, 2 Drawing Figures

BONDED TFE LIP SEAL

BACKGROUND OF THE INVENTION

This is a division, of application Serial No. 538,542, filed Jan. 6, 1975.

Field of the Invention

This invention relates to shaft seals, also known as oil seals, designed for sealing against fluid leakage along shafts such as engine crank shafts and motor vehicle drive transmission shafts, and in a preferred embodiment to shaft seals of the type including a metal case and a polytetrafluoroethylene sealing element connected thereto.

Description of the Prior Art

Shaft seals of the type including a metal case and a polytetrafluoroethylene sealing element connected thereto are known, however, they are presently made as assembled seals consisting of four component parts including an outer metal shell, an inner metal shell, a gasket and the polytetrafluoroethylene sealing element held in place by means of the outer shell being rolled over and crimped against the inner shell to mechanically hold the sealing element in place. The prior art manufacturing method requires numerous operations and the resulting seal is subject to damage encountered in handling, is subject to leakage between the outer metal case and the sealing element, and has an I.D. to O.D. concentricity problem.

It is an object of the present invention to provide an improved shaft seal of the type including an annular metal case and a polytetrafluoroethylene sealing element connected thereto, and a method for making the same comprising bonding a synthetic rubber filler ring between the metal case and the sealing element such that the filler ring chemically bonds to the metal case and mechanically bonds to the sealing element.

It is another object of the present invention to provide a shaft seal of the type including an annular metal case and a polytetrafluoroethylene sealing element, and a less expensive and faster method for making the same, that eliminates the prior art problems of a leakage route between the metal shell and the sealing element and of an I.D. to O.D. concentricity problem.

SUMMARY OF THE PRESENT INVENTION

A shaft seal of the type including a metal case and a flexible non-elastomeric polytetrafluoroethylene sealing element such as polytetrafluoroethylene and a method for making the same comprising molding an annular synthetic rubber filler ring in the annular space between a cylindrical portion of the metal case and a radial portion of the polytetrafluoroethylene sealing element such that the rubber filler ring mechanically bonds to the sealing element and chemically bonds to the metal case, thus eliminating a leakage path for fluid between the inside surface of the metal case and the sealing element as often existed in the prior art in spite of the presence of the gasket 56 (see FIG. 2).

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION OF THE PREFERRED EMBODIMENT

Figure 1:
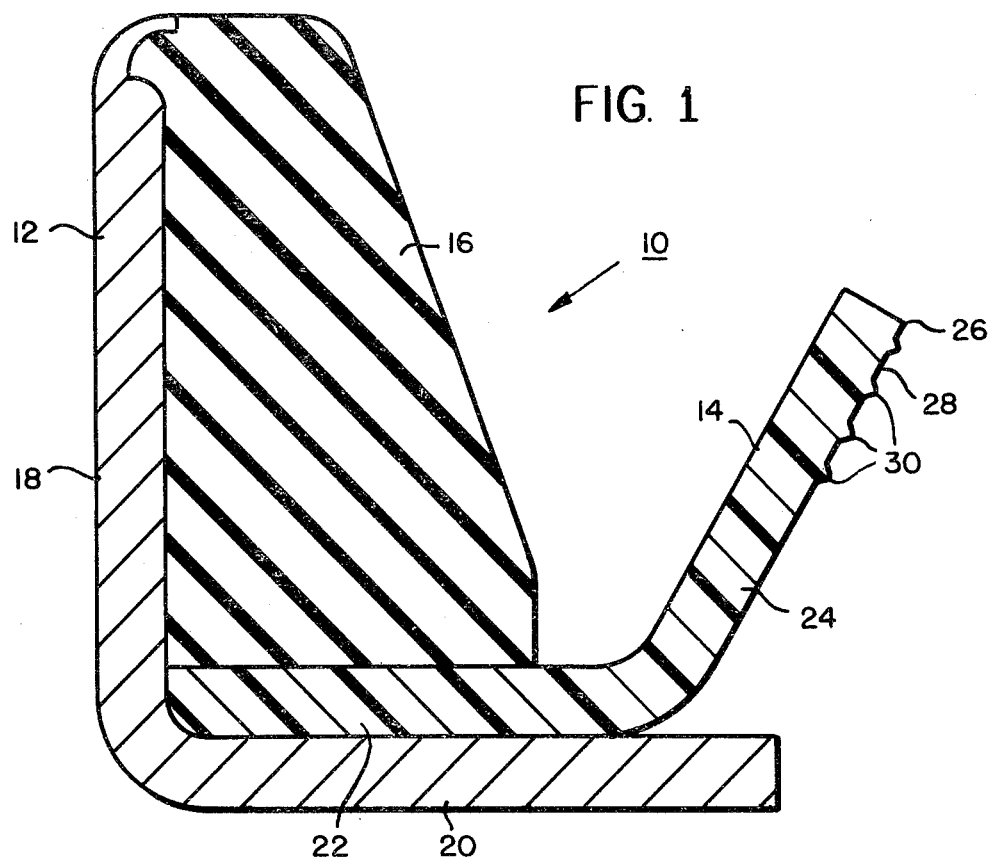
FIG. 1 is a cross-sectional view through one half of a shaft seal made according to a preferred embodiment of the present invention.

With reference now to the drawing, FIG. 1 shows a shaft seal 10 made according to the preferred embodiment of the present invention and including an annular metal shell or case 12, an annular polytetrafluoroethylene sealing element 14, and an annular synthetic rubber filler ring 16 molded in place and chemically bonded to the metal case 12 and mechanically bonded to the sealing ring 14. In another embodiment, the sealing element 14 need not be polytetrafluoroethylene but can be of any non-elastomeric material although preferrably a plastic resin.

The metal case 12 includes a cylindrical portion 18 and a radial flange 20. The sealing element 14 includes a radial portion 22 and a frusto-conical portion 24 having a sealing lip 26 and a shaft engaging surface 28 having formed thereon, during the process of molding the filler ring 16, a plurality of hydrodynamic pumping elements 30, of one of the types that are well-known in the art.

In the process of making the shaft seal 10, the metal case 12 is placed in a mold with the radial portion 22 of the sealing element 14 placed against the radial flange 20. In the preferred embodiment, transfer molding is used. In that method, the mold is closed to form an annular space between the cylindrical portion of the metal case and the sealing element, and synthetic rubber is transferred into such annular space and cured. Compression molding can also be used, in which case an annular blank prep form of synthetic rubber is placed in the annular space and is formed into the annular filler ring upon closing the mold. The mold usually is closed for about 3–4 minutes, and a temperature of about 360°–400° F and a pressure of about 16,000–20,000 psi is used.

The manner in which a mechanical bond is formed between a rubber element such as the filler ring 16, and a polytetrafluoroethylene element such as the sealing element 14, and a chemical bond is formed between a rubber element and a metal element, such as the metal case 12, are well-known to those skilled in the art and in and of itself forms no part of the present invention and therefore need not be described in detail herein. It will suffice, therefore, to simply state that the sealing element 14 is etched, by acid for example, to provide a large number of small pits for the rubber of the filler ring 16 to flow into, to provide the mechanical bonding, as is well-known in the art. The metal case 12 is phosphated and cemented (using, for example, a methyl ethyl ketone base adhesive), prior to insertion into the mold, to inhance the production of a chemical bond, as is also well-known in the art.

The present invention eliminates the I.D. to O.D. concentricity problems in the prior art as follows. In large shaft seals, the sealing element is located on a mold center pin while the metal case is located in the mold cavity (some locating means for the metal case, such as a rib, can be used if desired). Assuming that the mold is properly concentric, so will be the resultant shaft seal. In smaller shaft seals, the sealing element is in the form of a solid disc and the shaft receiving opening therein is cut during the molding operation, such as by the center pin. The metal shell is located in the mold and assuming the mold is properly concentric, so will be the resultant shaft seal.

Figure 2:
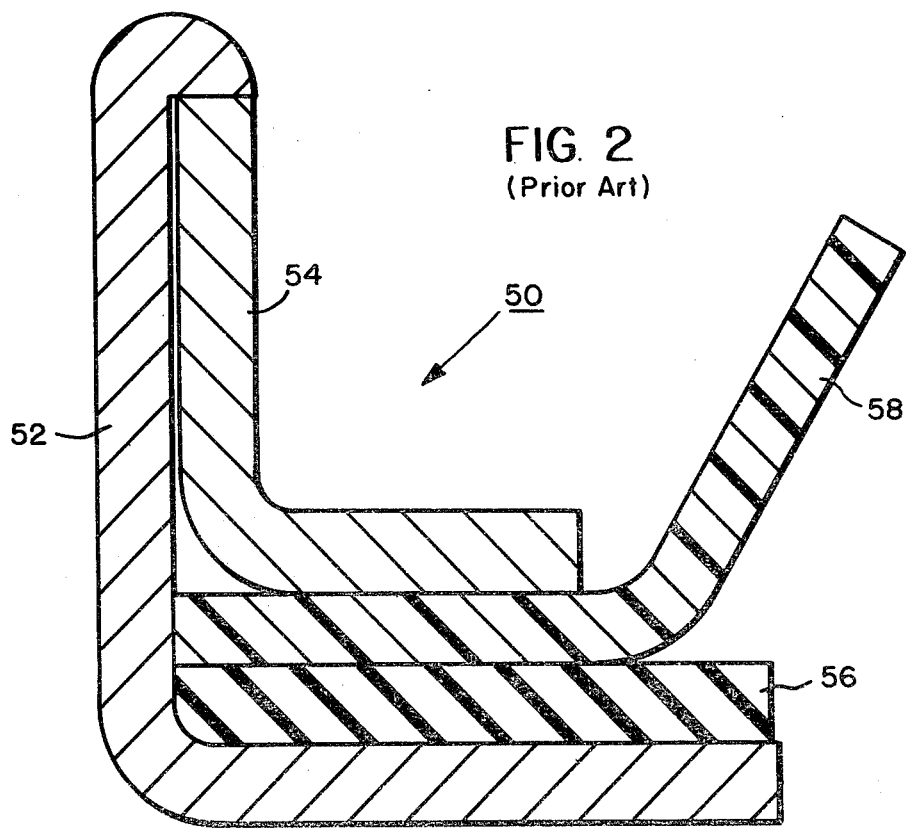
FIG. 2 is a cross-sectional view through one half of a prior art shaft seal.

Referring again to the drawing, FIG. 2 shows the prior art shaft seal 50 (and method of assembly); the seal 50 includes an outer metal shell 52, an inner metal shell 54, a gasket 56 made, for example, of rubber or silicone, and a polytetrafluoroethylene sealing element 58. The sealing element 58 is not bonded to any of the other components. The assembly is held together by means of the outer shell 52 being rolled over and crimped against the inner shell 54.

While the preferred embodiment of the present invention has been described in detail, it will be understood by those skilled in the art, that various modifications and changes therein can be made as will be evident to one skilled in the art. For example, the exact nature, such as the shape and material, of the metal case 12, the filler ring 16 and the sealing element 14 need not be identically as shown in FIG. 1. The metal case, for example, need not have a radial flange of the extent shown in FIG. 1. Further, the hydrodynamic pumping elements 30 are not essential but are only preferred, and any known types of such pumping elements can be used.

The invention has been described in detail with particular reference to the preferred embodiments thereof, but it will be understood that variations and modifications can be effected within the spirit and scope of the invention as described hereinabove and as defined in the appended claims.

We claim:

1. A method for making a shaft seal of the type including a single annular metal case including a cylindrical portion and a radial flange and an annular flexible non-elastomeric sealing element having a radial portion in contact with said radial flange and also having a frusto-conical portion with a sealing lip on the distal end thereof comprising positioning an annular synthetic rubber filler ring in the annular space between said cylindrical portion of said metal case and said radial portion of said sealing element and being spaced away from and out of contact with said frusto-conical portion of said sealing element, and bonding said filler ring solely to both said cylindrical portion of said metal case and said radial portion of said sealing element, said positioning and bonding steps comprising molding said filler ring in place, and including the step of molding a plurality of hydrodynamic pumping elements on a shaft engaging surfce of said frusto-conical portion of said sealing element during said molding step.

2. The method according to claim 1 wherein said nonelastomeric sealing element comprises a plastic resin.

3. The method according to claim 1 wherein said sealing element is polytetrafluoroethylene.

4. A method for making a shaft seal of the type including a single annular metal case including a cylindrical portion and a radial flange and an annular flexible nonelastomeric sealing element having a radial portion in contact with said radial flange and also having a frusto-conical portion with a sealing lip on the distal end thereof, comprising the steps of positioning an annular synthetic rubber filler ring in the annular space between said cylindrical portion of said metal case and said radial portion of said sealing element and being spaced away from and out of contact with said frusto-conical portion of said sealing element, and bonding said filler ring solely to said cylindrical portion of said metal case and said radial portion of said sealing element to hold said sealing element in place.

5. The method according to claim 4 wherein said non-elastomeric sealing element comprises a plastic resin.

6. The method according to claim 4 wherein said sealing element is polytetrafluoroethylene.

7. The method according to claim 4 wherein said positioning and bonding step includes molding said filler ring in place.

8. A method for making a shaft seal of the type including an annular metal case including a cylindrical portion and a radial flange and an annular flexible non-elastomeric sealing element having a radial portion and a frustoconical portion, comprising the steps of:
 (a) placing the metal case in a mold cavity,
 (b) placing the sealing element in the mold cavity with the radial portion in contact with the axially inner surface of the radial flange,
 (c) molding an annular filler ring of elastomer in the space between the cylindrical portion of the metal case and the axially inner surface of the radial portion of the sealing element and spaced away from and out of contact with said frusto-conical portion of said sealing element, and
 (d) bonding said filler ring to said cylindrical portion and to said radial portion such that said filler ring holds said sealing element in place against said radial flange.

9. The method according to claim 8 wherein said sealing element is polytetrafluoroethylene.

10. The method according to claim 8 wherein said molding step comprises compression molding said filler ring.

11. The method according to claim 8 wherein said molding step comprises transfer molding said filler ring.

12. The method according to claim 11 wherein said sealing element is polytetrafluoroethylene.

13. The method according to claim 12 including substantially filling said annular space with said filler ring.

* * * * *